United States Patent
Rakshit et al.

(10) Patent No.: US 11,360,576 B1
(45) Date of Patent: Jun. 14, 2022

(54) MOVEMENT PATTERN-BASED MOBILE DEVICE USER INTERFACES

(71) Applicant: International Business Machines Corporation, Armonk, NY (US)

(72) Inventors: Sarbajit K. Rakshit, Kolkata (IN); Justin David Weisz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/128,307

(22) Filed: Dec. 21, 2020

(51) Int. Cl.
| | |
|---|---|
| *G06F 3/0482* | (2013.01) |
| *G06F 3/0346* | (2013.01) |
| *G06F 3/0487* | (2013.01) |
| *G06F 3/14* | (2006.01) |
| *H04W 88/02* | (2009.01) |

(52) U.S. Cl.
CPC .......... *G06F 3/0346* (2013.01); *G06F 3/0482* (2013.01); *G06F 3/0487* (2013.01); *G06F 3/1423* (2013.01); *G06F 2203/04803* (2013.01); *H04W 88/02* (2013.01)

(58) Field of Classification Search
CPC ....... G06F 3/0236; G06F 3/012; G06F 3/0481
See application file for complete search history.

(56) References Cited

U.S. PATENT DOCUMENTS

| | | | |
|---|---|---|---|
| 9,959,040 B1 | 5/2018 | Zhang | |
| 10,254,940 B2 | 4/2019 | Carey et al. | |
| 2011/0141141 A1* | 6/2011 | Kankainen | G06T 3/4038 345/632 |
| 2011/0300876 A1* | 12/2011 | Lee | G01C 21/362 455/456.1 |
| 2014/0006966 A1* | 1/2014 | Geraci | G06T 19/006 715/748 |
| 2014/0278053 A1* | 9/2014 | Wu | G01C 21/3647 701/408 |
| 2014/0306996 A1* | 10/2014 | Cao | G01C 21/3682 345/633 |
| 2014/0362195 A1* | 12/2014 | Ng-Thow-Hing | G06F 3/04815 348/51 |
| 2016/0004416 A1* | 1/2016 | Kim | G06F 3/0485 715/769 |

(Continued)

OTHER PUBLICATIONS

"Android haptics", Google, Website, printed Nov. 6, 2020, 11 pages. https://material.io/design/platform-guidance/android-haptics.html.

(Continued)

*Primary Examiner* — Rayeez R Chowdhury
(74) *Attorney, Agent, or Firm* — Timothy J. Singleton

(57) ABSTRACT

A method, system, and computer program product for motion-based user interfaces are provided. The method identifies a navigation mode indication. A navigation interface is generated at a display device and configured based on the navigation mode indication to include a first graphical content. At least a portion of the navigation interface is modified based on one or more movements of the mobile computing device. A portion of the navigation interface is selected based on detecting a pressure change on at least a portion of a mobile computing device. The method presents a second graphical content on the display device based on the selected portion of the navigation interface.

17 Claims, 6 Drawing Sheets

(56) References Cited

U.S. PATENT DOCUMENTS

2016/0260253 A1* 9/2016 Reddy ................. G06T 7/33
2018/0307401 A1* 10/2018 Carey ................. G06F 3/017

OTHER PUBLICATIONS

"Method to hold and interact with mobile device using one hand via Multi-dimensional user interface", An IP.com Prior Art Database Technical Disclosure, IP.com No. IPCOM000208799D, IP.com Electronic Publication Date: Jul. 18, 2011, 4 pages.

"Personalizing and improving accessibility based on the user's holding pattern of mobile devices", An IP.com Prior Art Database Technical Disclosure, IP.com No. IPCOM000262531D, IP.com Electronic Publication Date: Jun. 9, 2020, 4 pages.

Mell et al., "The NIST Definition of Cloud Computing", Recommendations of the National Institute of Standards and Technology, Special Publication 800-145, Sep. 2011, 7 pages.

* cited by examiner

US 11,360,576 B1

MOVEMENT PATTERN-BASED MOBILE DEVICE USER INTERFACES

BACKGROUND

Mobile computing devices, such as smart phones, have been subject to iterative increases in capabilities from their inception. Among the capability increases, display screens have increased in resolution and clarity. Along with resolution, display screen sizes and dimensions for mobile computing devices have gradually increased. Usability of mobile computing devices is often associated the clarity of display screens as well as the size and dimensions of those display screens.

SUMMARY

According to an embodiment described herein, a computer-implemented method for motion-based user interfaces is provided. The method identifies a navigation mode indication. A navigation interface is generated at a display device and configured based on the navigation mode indication to include a first graphical content. At least a portion of the navigation interface is modified based on one or more movements of the mobile computing device. A portion of the navigation interface is selected based on detecting a pressure change on at least a portion of a mobile computing device. The method presents a second graphical content on the display device based on the selected portion of the navigation interface.

According to an embodiment described herein, a system for motion-based user interfaces is provided. The system includes one or more processors and a computer-readable storage medium, coupled to the one or more processors, storing program instructions that, when executed by the one or more processors, cause the one or more processors to perform operations. The operations identify a navigation mode indication. A navigation interface is generated at a display device and configured based on the navigation mode indication to include a first graphical content. At least a portion of the navigation interface is modified based on one or more movements of the mobile computing device. A portion of the navigation interface is selected based on detecting a pressure change on at least a portion of a mobile computing device. The operations present a second graphical content on the display device based on the selected portion of the navigation interface.

According to an embodiment described herein, a computer program product for motion-based user interfaces is provided. The computer program product includes a computer-readable storage medium having program instructions embodied therewith, the program instructions being executable by one or more processors to cause the one or more processors to identify a navigation mode indication. A navigation interface is generated at a display device and configured based on the navigation mode indication to include a first graphical content. At least a portion of the navigation interface is modified based on one or more movements of the mobile computing device. A portion of the navigation interface is selected based on detecting a pressure change on at least a portion of a mobile computing device. The computer program product presents a second graphical content on the display device based on the selected portion of the navigation interface.

DETAILED DESCRIPTION

Figure 1:
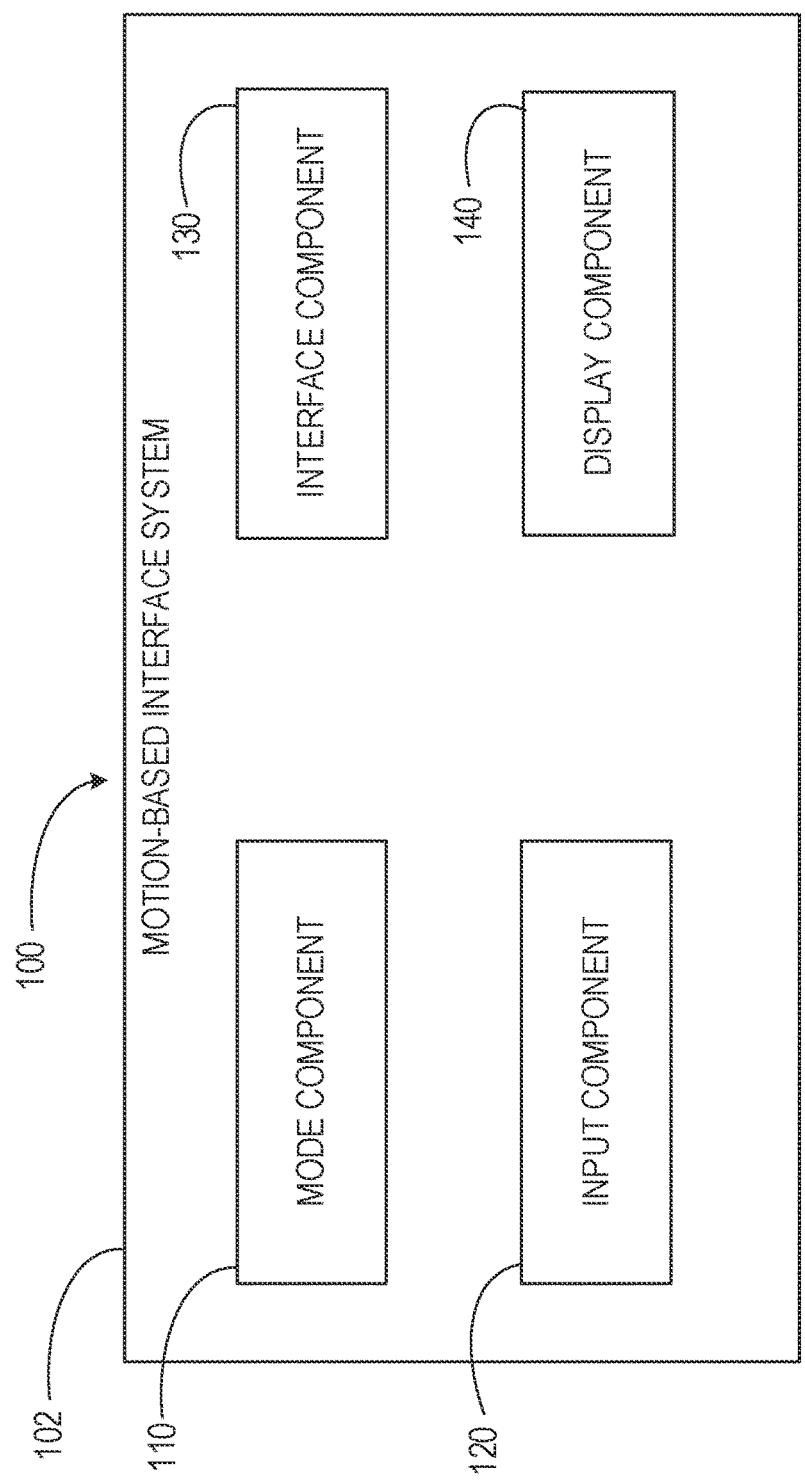
FIG. 1 depicts a block diagram of a computing environment for implementing concepts and computer-based methods, according to at least one embodiment.

The present disclosure relates generally to methods for motion-based user interfaces. More particularly, but not exclusively, embodiments of the present disclosure relate to a computer-implemented method for dynamically generating motion-based navigation interfaces to enable navigation using a uniform grip on a mobile computing device. The present disclosure relates further to a related system for motion-based user interfaces, and a computer program product for operating such a system.

Mobile computing devices have increased in size and changed dimensions with each new iteration. Larger sizes of display devices and the mobile computing devices that include them can cause trouble to some users attempting to grip the devices securely or properly. Often, users perform user interface navigation on the mobile computing device with a single hand. Single-handed user interface navigation may force users to change hand position, resulting in a loss of a secure grip on the mobile computing device due to the device's dimensions. Further, single-handed operation of mobile computing devices may place portions of a user interface, such as edges of a display device, out of reach of some users. In order to address these grip difficulties and reach issues, users are often forced to engage in two-handed interaction with mobile computing devices. Users performing two-handed navigation may hold the mobile computing device with one hand while using the other hand to interact with buttons or a touch screen display. However, some environments and situations prevent users from engaging in two-handed interaction.

Embodiments of the present disclosure enable dynamic identification of user interface modes for users interacting with mobile computing devices. Some embodiments of the present disclosure enable generation and presentation of a navigation interface. The navigation interface may enable navigation of a mobile computing user interface using a secure gripping state. Some embodiments of the present disclosure enable movement-based interaction with the user interface of a mobile computing device. Movement-based interaction may enable navigation of user interfaces with a secure grip using single-handed interactions. In some embodiments, the navigation interface enables movement-based interaction to be performed by movement of a mobile computing device using a single hand. The single-handed interaction of the navigation interface enables a user to interact with a mobile computing device via the user changing an orientation of the mobile computing device. The navigation interface enables single-handed user interface interactions by detecting changes in movement or angle of the mobile computing device along any axis. The navigation interface enables single-handed user interface interactions by detecting changing pressure or velocity exerted on at least a portion of a mobile computing device. As described, embodiments of the present disclosure address difficulties involved in single-handed operation of mobile computing devices. Similarly, described embodiments of the present disclosure address difficulties with maintaining a secure grip on a mobile computing device while engaging in single-handed operation.

Some embodiments of the concepts described herein may take the form of a system or a computer program product. For example, a computer program product may store program instructions that, when executed by one or more processors of a computing system, cause the computing system to perform operations described herein with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a motion-based interface system 102. The motion-based interface system 102 may comprise a mode component 110, an input component 120, an interface component 130, and a display component 140. The mode component 110 identifies and selects navigation modes for a mobile computing device. The input component 120 determines input received from sensor and input devices of the mobile computing device. The interface component 130 interprets received inputs and generates user interfaces for the mobile computing device. The display component 140 presents user interfaces on a display device of the mobile computing device. Although described with distinct components, it should be understood that, in at least some embodiments, components may be combined or divided, and/or additional components may be added without departing from the scope of the present disclosure.

Figure 2:
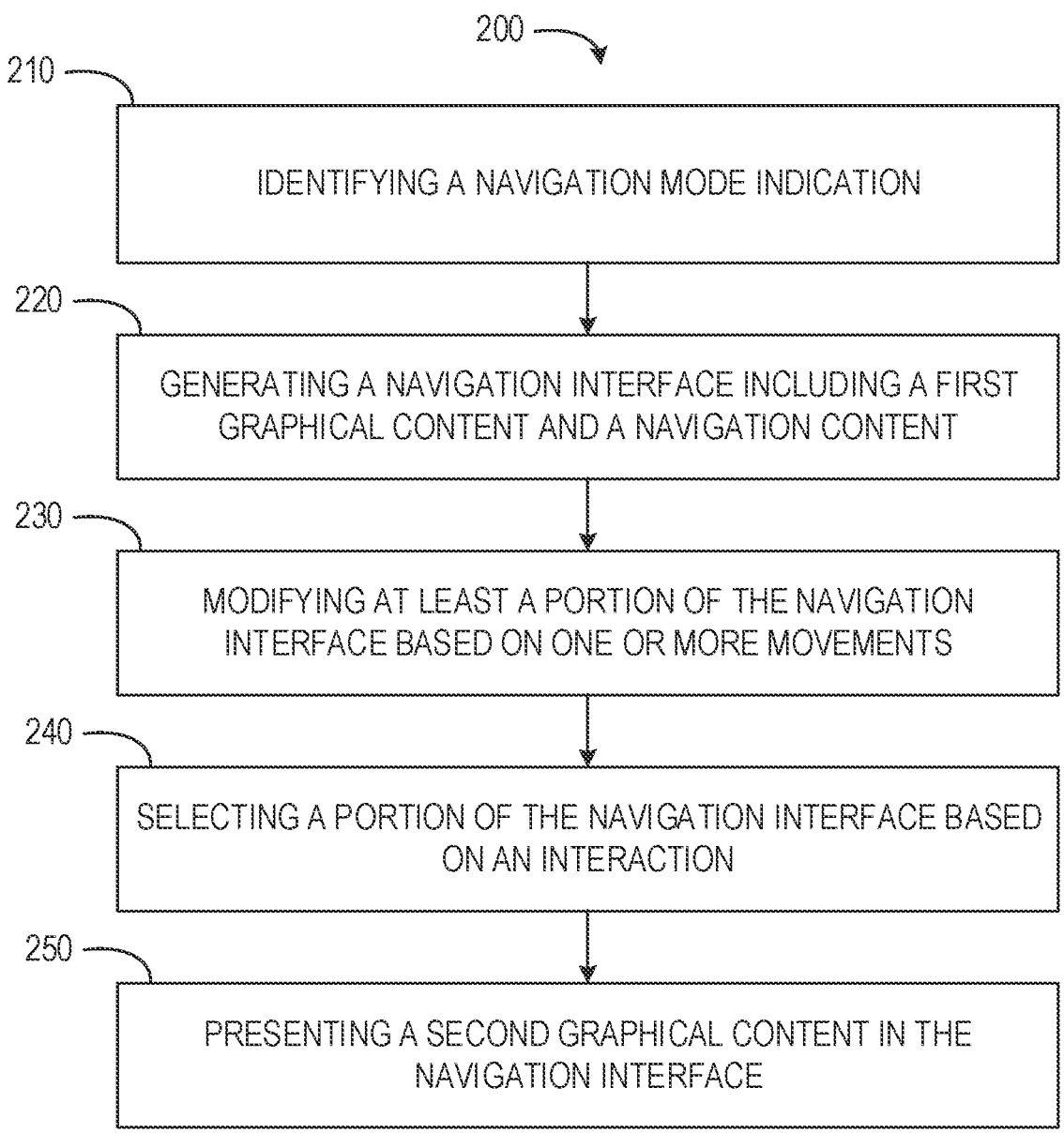
FIG. 2 depicts a flow diagram of a computer-implemented method for motion-based user interfaces, according to at least one embodiment.

Referring now to FIG. 2, a flow diagram of a computer-implemented method 200 is shown. The computer-implemented method 200 is a method for motion-based user interfaces. In some embodiments, the computer-implemented method 200 may be performed by one or more components of the computing environment 100, as described in more detail below.

At operation 210, the mode component 110 identifies a navigation mode indication. The navigation mode indication being received by the mode component 110 at a mobile computing device. The navigation mode indication may signal to the mode component 110 a selection of single-handed operation for a mobile computing device. Upon receipt of the navigation mode indication, the mode component 110 may select a specified navigation mode. The mode component 110 may pass the navigation mode indication to the interface component 130 to generate an interface corresponding to the specified navigation mode.

In some embodiments, the input component 120 receives a selection from an input device of the mobile computing device. The selection may indicate a user's intention to change from a first navigation mode to a second navigation mode. In some instances, the selection is received by the input component 120 based on a user's predefined pattern of holding the mobile computing device, a user behavior, a user voice command, combinations thereof, or any other suitable input indication. The input component 120 may receive the selection through one or more input devices. The input devices may include one or more accelerometers, one or more pressure sensors, one or more buttons, one or more movement sensors, a compass, an orientation sensor, a microphone, combinations thereof, or any other suitable input devices.

The input component 120 may monitor for input signals or input sequences representing or predetermined to be the navigation mode indication to activate single-handed operation of the mobile computing device. In some embodiments, the input component 120 receives a set of taps as the navigation mode indication. The set of taps may be identified by an accelerometer within the mobile computing device. For example, two or three taps to a back of the mobile computing device may be programmed as a predefined navigation mode trigger. The set of taps may also include a specified delay, such as two taps, a one second delay, and a second set of two taps. The input component 120 may analyze accelerometer data for spikes or impacts within a Z axis of the mobile computing device (e.g., where an X and Y axis define a plane that extends along a major surface of the mobile computing device). Once receiving an initial tap or impact, the input component 120 may log accelerometer data to identify a pattern (e.g., the set of taps) representing the navigation mode indication. In some instances, the input component 120 identifies the navigation mode indication through a microphone by identifying a voice command to switch to single-handed operation or motion-based operation. In some embodiments, the input component 120 monitors a pattern of movement of the mobile computing device within one or more axis. The input component 120 may identify a pattern of movement associated with the navigation mode indication as having been sensed by an accelerometer or other motion sensors. In some instances, the input component 120 may monitor one or more pressure sensors or buttons of the mobile computing device for a pattern corresponding to the navigation mode indication. The pressure sensors may identify existence of pressure, relative amounts of pressure, and areas of the mobile computing device to which pressure is being applied. For example, the input component 120 may detect pressure being applied evenly on opposing sides of the mobile computing device in a pattern (e.g., two rapid squeezes of the mobile computing device) to identify the navigation mode indication based on pressure sensors.

Once the input component 120 identifies sensor input corresponding to the navigation mode indication, the input component 120 may pass the sensor data, a consolidated input command, or the navigation mode indication to the mode component 110. Upon receiving input from the input component 120, the mode component 110 may identify the navigation mode indication. The mode component 110, upon identifying the navigation mode indication, may select the specified or corresponding navigation mode (e.g., single-handed operation). The mode component 110 may then trigger the interface component 130 to generate the navigation interface associated with the selected navigation mode.

Although described with respect to specified predefined sensor input, it should be understood that the mode component 110 and the input component 120 may receive any suitable input for the navigation mode indication. In some embodiments, a user of the mobile computing device may select, define, or program a movement, set of movements, or other defined input to trigger the navigation mode indicator. For example, the user may define a distance range of hand movement, a series of movements, a series of taps, a series of delays, a key word, a voice key word, a voice phrase, combinations thereof, or any other suitable input as the navigation mode indicator or input corresponding thereto. In some instances, user-defined distance or movements may indicate differing selections within a navigation interface. For example, a relatively small hand movement may change from one app to another, a large hand movement may change between apps, or a movement in a Z axis may change between apps.

At operation 220, the interface component 130 generates a navigation interface. The navigation interface may be configured based on the navigation mode indication. In some embodiments, the interface component 130 generates the navigation interface by splitting a display screen or user interface. The interface component 130 may split the user interface by generating a dividing line within the user interface on the display. The interface component 130 may compress a portion of the content currently being presented within a user interface to fit a portion of the user interface without overlapping or crossing the dividing line.

In some embodiments, the navigation interface includes a first graphical content. In some embodiments, the display component 140 presents the navigation interface with the first graphical content within a first portion of a user interface. The first graphical content may be presented on a display device associated with the mobile computing device. The first portion of the user interface may be a larger portion of the user interface. The first graphical content may be actual content which is to be navigated during single-handed operation of the mobile computing device. The actual content may be content currently presented on a display device of the mobile computing device prior to the mobile computing device entering a single-handed operation mode. In some instances, the first graphical content may be content that was presented on the display device of the mobile computing device at a time when the navigation mode indicator was received or identified.

The display component 140 may present a navigation content in a second portion of the user interface. The second portion of the user interface may be a smaller portion of the user interface relative to the first portion displaying the first content. The navigation content may include navigable graphical content. The navigable graphical content may be presented within a grid. The grid may have a set of grid positions. In some embodiments, the grid may have nine grid positions. The grid may be overlaid on the first content presented within the first portion of the navigation interface. The navigation content (e.g., the first content and the overlaid grid) may be presented in a size and dimension configured for the second portion of the user interface.

The navigation content may present menu options compiled from a list of available actions in a currently displayed user interface (e.g., the first graphical content). The menu options may be organized based on option criteria. The interface component 130 may organize the menu options based on criteria such as frequency of use. Frequency of use may be determined by past interactions of the user with the mobile computing device or an application. Frequency of use may also be determined by usage data aggregated across interactions of a plurality of users. Aggregated usage data may be sanitized to prevent identification of users or user actions.

In some embodiments, actions or options may be specified within a mobile application as part of an available user interface specification. The menu options may be presented based on a specification of the mobile application. In some instances, the interface component 130 analyzes the first graphical content for selectable interface elements. The selectable interface elements may include buttons, links, and input fields. In some instances, the interface component 130 inspects applications currently running on the mobile computing device. One or more interface elements may be generated within the navigation content to enable switching between the currently running applications. The interface component 130, after building a list of available actions, maintains a current selection state using information from the input component 120. The interface component 130 may also execute selected commands when invoked or remove menus, options, or content from the navigation interface in response to shaking the mobile computing device.

In some embodiments, the navigation content is displayed or presented in a second display device. The second display device may be associated with an augmented reality (AR) device. For example, where the AR device is a head mounted AR device with an AR display (e.g., glasses with a display in a lens), the navigation content may be presented within the AR display. In such embodiments, movement of the AR device may be incorporated by the mode component 110, the input component 120, and the interface component 130 to determine the navigation mode indicator, selection of the navigation mode indicator, navigation of the navigation content, and selection of interface elements presented within the navigation content or the first graphical content.

In some embodiments, the navigation content is presented by identifying a set of selectable interface elements within the first graphical content. The set of selectable interface elements may be interface elements or options contained in one or more menus present within the first graphical content. At least a subset of selectable interface elements may be mapped to the set of grid positions presented within the grid. For example, the first content may be a website presented within a web browser. The web browser may have a set of navigation options, such as back, forward, and refresh. The website may include six menu options. Where the grid contains nine positions, three positions may be mapped to the three web browser navigation options and six may be mapped to the six menu options of the website. Although described with respect to specified numbers of grid positions and menu options, it should be understood that the navigation content may contain any suitable number of grid positions and any suitable number of menu options may be mapped to the grid positions. In some instances, menu options may be mapped to grid positions in a hierarchical manner. In such instances, selection of a grid position mapped to a first hierarchical menu layer may cause the interface component 130 to generate a subsequent navigation content interface. The subsequent navigation content interface may contain a set of grid positions mapped to a second hierarchical menu layer corresponding to available interface or menu options related to a selected menu option of the first hierarchical menu layer.

In some instances, the navigation content may be presented with some static menu options, such as back, forward, refresh, and application switch. Back and forward may move between hierarchical menu layers or between current and previously viewed content. Selection of the application switch may provide a list of available applications and enable selection between application representations or icons to present a new or subsequent application.

At operation 230, the interface component 130 modifies at least a portion of the navigation interface based on one or more movements of the mobile computing device. In some embodiments, the display component 140 presents the navigation interface on a display device of the mobile computing device. The display component 140 may initially present the navigation interface with a highlighted or selected portion of the navigation content within the navigation interface. The input component 120 and the interface component 130 may monitor movement characteristics of the mobile computing device. The movement characteristics may include an orientation, a direction, a motion or acceleration along one or more axis, a pressure applied to at least a portion of the mobile computing device, combinations thereof, or any other suitable movement characteristics. For example, the input component 120 and the interface component 130 may monitor movement of the mobile computing device responsive to hand or wrist movements of the user.

The monitored movement of the mobile computing device may be mapped to a pointer positioned within a grid position of the navigation content. In some embodiments, motions of the mobile computing device may be mapped to predetermined navigations. For example, a gyroscope may provide upward, downward, leftward, and rightward orientation movements of the mobile computing device. The upward movement may be determined where a top part of the mobile computing device rotates away from the user. The rotations sensed by the gyroscope may move the pointer across different menu items or grid positions. Tapping a body of the mobile computing device may commit or select to an action. Shaking of the mobile computing device may cancel an action or exit single-handed operation. Shaking of the mobile computing device may be identified by positive and negative movement of the mobile computing device within an X axis or a Y axis.

In some instances, the grid position of the pointer may start at an initial position within the highlighted portion of the grid and the navigation content. For example, the initial position may be a center point within a center highlighted portion of the grid. Changes in the monitored movement of the mobile computing device, such as rotations of the mobile computing device, may cause the interface component 130 and the display component 140 to modify a position of the pointer to change the initial position of the pointer to a subsequent position within the grid of the navigation interface. For example, as the mobile computing device is moved, tilted, pointed in a different direction, or otherwise moved, the pointer may be moved about the navigation content and the grid. As the pointer is moved to subsequent positions, the grid position surrounding the subsequent positions may be highlighted by the interface component 130 and the display component 140. Thus, the interface component 130 may direct movement of the pointer within the grid based on directions of hand movements, wrist movements, and movements of the mobile computing device. Further, the movement of the pointer may be shown in the grid of the navigation content. Similarly, the split interface showing the navigation content and the first graphical content may show or reflect directions of hand movements, mapped to grid navigation.

Although described with respect to grid positions, menu options or user interface elements may also be presented as a list, or any other suitable interface layout which is navigable by motion.

At operation 240, the interface component 130 selects a portion of the navigation interface based on detecting an interaction with the mobile computing device. In some embodiments, the interaction is a motion-based interaction. For example, tapping the mobile computing device may select the portion of the navigation interface. The motion-based interaction may indicate selection of a user interface element associated with the portion of the navigation interface. The motion-based interaction may be any interaction, quick movement, tap, or series of taps capable of being detected by a sensor associated with the input component 120. In some instances, the interaction is a pressure change on at least a portion of the mobile computing device. For example, the pressure change may be pressure applied to one or more button or one or more pressure sensitive area of the mobile computing device. In some embodiments, the interaction with the mobile computing device may be a voice interaction, such as a voice command received by a microphone associated with the input component 120. The interaction with the mobile computing device may also be a visual interaction, such as nodding, winking, or other interaction identified by an image capture device associated with the input component 120.

In some embodiments, the interface component 130 and the display component 140 may change a highlighted grid position from a first grid position to a second grid position. The highlighting of the second grid position may be performed based on movement of the pointer mapped to the movement of the mobile computing device. Each grid position may be associated with a user interface element, a menu option, a navigation option, or other selectable aspect of the first graphical content presented in the first portion of the navigation interface. Upon highlighting the second grid position, the input component 120 and the interface component 130 may detect the interaction as a pressure applied to opposing sides or edges of the mobile computing device. The interaction may indicate to the input component 120 and the interface component 130 that the user desires to select a user interface element or option associated with the second grid position. In some embodiments, a magnitude of pressure applied to opposing sides or edges of the mobile computing device may indicate a type of selection. For example, pressure having a magnitude between a first pressure threshold and a second pressure threshold may indicate selection of the second grid position. Pressure magnitude above the second pressure threshold may indicate a second selection type, such as selection of a hierarchical navigation, selection between applications, selection for initiating writing of text using motion, or any other suitable interface selection.

At operation 250, the interface component 130 presents a second graphical content. In some embodiments, the second graphical content is presented on the display device of the mobile computing device. The second graphical content may be presented in the first portion of the navigation interface, replacing the first graphical content. Presentation of the second graphical content may be triggered by receiving selection of the portion of the navigation interface detected in operation 240. The second graphical content may be associated with the user interface element or option associated with the second grid position and selected in operation 240.

For example, the first graphical content may be a website having a set of navigation options and a set of menu options. The menu options may be mapped to separate grid positions within the navigation content in the navigation interface. The second grid position, to which the pointer is navigated based on mapped movement of the pointer and the mobile computing device, may be a link to an internet address. The internet address may contain the second graphical content. The link may be a hyperlink represented as a user interface element selectable within the first graphical content or the navigation content. Once the second grid position, and the associated link, is selected, the interface component 130 and the display component 140 may cooperate to load the second graphical content from the internet address and display the second graphical content in place of the first graphical content in the first portion of the navigation interface.

In some embodiments, each movement and selection within the navigation interface may be used as input to a machine learning model for the user. Actual device and hand movements of the user may be captured and used to learn intended interface movements. In some embodiments, the machine learning model for the user may discern between noise movements, such as jostling or bumps on public transportation, and intended movements.

Figure 3:
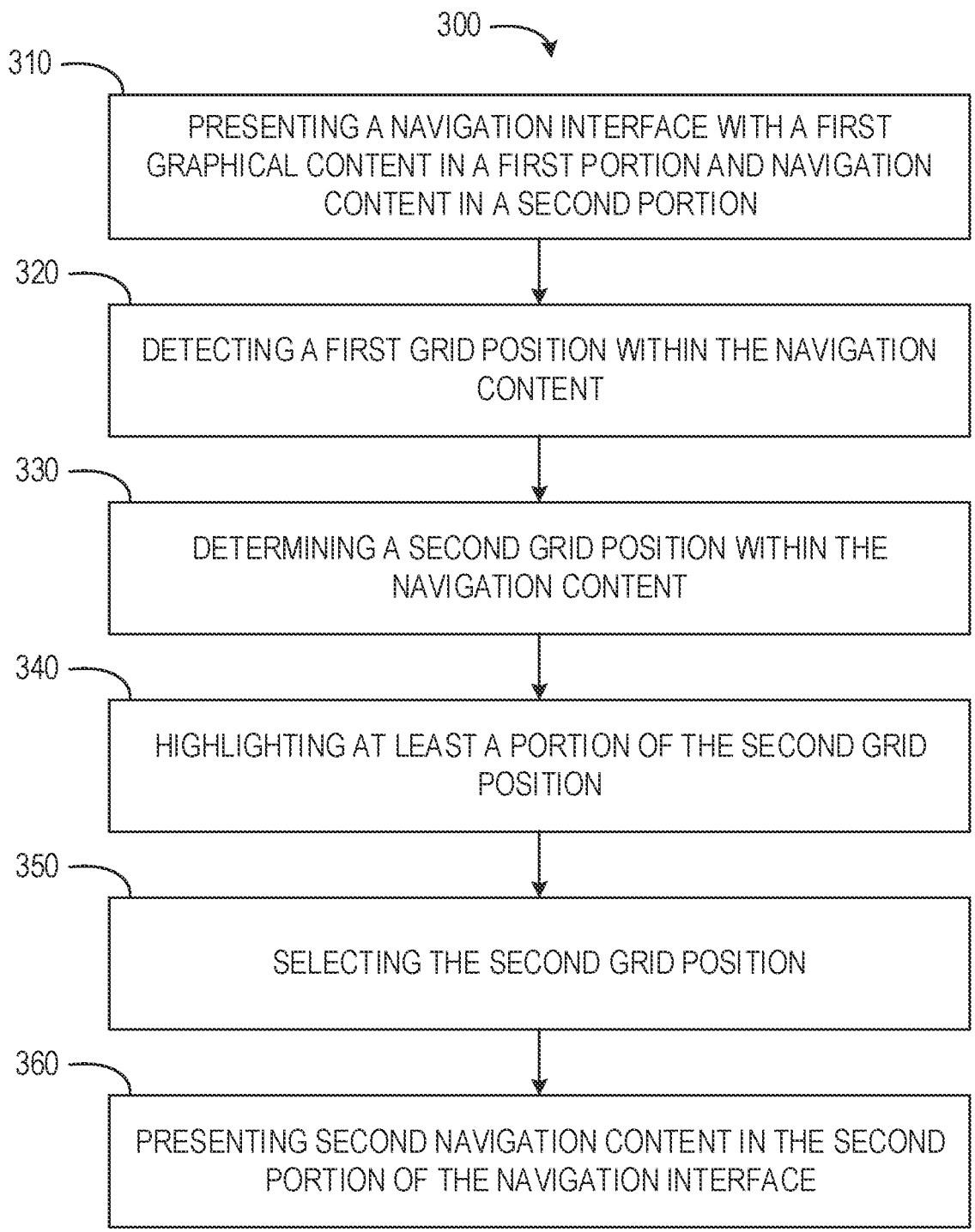
FIG. 3 depicts a flow diagram of a computer-implemented method for motion-based user interfaces, according to at least one embodiment.

FIG. 3 shows a flow diagram of an embodiment of a computer-implemented method 300 for motion-based user interfaces. The method 300 may be performed by or within the computing environment 100. In some embodiments, the method 300 comprises or incorporates one or more operations of the method 200. In some instances, operations of the method 300 may be incorporated as part of or sub-operations of at least one operation of the method 200.

In operation 310, the interface component 130 presents a navigation interface. In some embodiments, the navigation interface is presented with a first graphical content in a first portion of a user interface. Navigation content may be presented in a second portion of the user interface. The navigation content may include navigable graphical content presented within a set of grid positions. The navigation interface may be presented in a manner similar to or the same as described above with respect to operations 210-230.

In operation 320, the interface component 130 detects a first grid position within the navigation content. The first grid position may be an initial position. The interface component 130 may detect the first grid position as a starting point of a pointer mapped to movement of the mobile computing device. The interface component 130 may highlight the first grid position once the navigation interface is presented on the display device of the mobile computing device. In some embodiments, the interface component 130 detects and highlights the first grid position in a manner similar to or the same as described above with respect to operations 230 and 240.

In operation 330, the interface component 130 determines a second grid position within the navigation content. The second grid position may be determined based on one or more movements of the mobile computing device. The one or more movements may be reflected by movements of the pointer within the grid of the navigation content. In some instances, the second grid position is determined and highlighted once the pointer crosses a grid line or grid threshold separating the first grid position from the second grid position. When the pointer crosses the grid line, haptic feedback may be generated within the mobile computing device to indicate movement from one interface option to a subsequent interface option. In some embodiments, the interface component determines the second grid position in a manner similar to or the same as described above with respect to operations 230 and 240.

In operation 340, the interface component 130 highlights at least a portion of the second grid position. The interface component 130 may highlight the portion of the second grid position when the pointer crosses the grid line or grid threshold between the first grid position and the second grid position. In some embodiments, the entire second grid position is highlighted once the pointer crosses into the second grid position (e.g., a square within the navigation grid). In some instances, an area around the pointer is highlighted within the second grid position. The area around the pointer may mimic a finger position tracking along the navigation content of the navigation interface.

In operation 350, the interface component 130 selects the second grid position. The interface component 130 may select the second grid position based on an interaction with the mobile computing device. For example, the selection may be based on a voice command, a pressure change on at least a portion of the mobile computing device, a tap on a portion of the mobile computing device, or any other detectable selection received by the input component 120 and the interface component 130. In some embodiments, selection of the second grid position may be performed in a manner similar to or the same as described above with respect to operation 240.

In some embodiments, the second grid position corresponds to a selectable interface element. The selectable interface element may be one of a subset of selectable interface elements. The subset of selectable interface elements may be a first subset of selectable interface elements. In some embodiments, the subset of selectable interface elements may correspond to a hierarchical navigation menu having a set of options. Each option may correspond to a hierarchical layer within the hierarchical navigation menu. Further, each option may be associated with one or more other menu options in a higher or lower hierarchical layer. For example, menu options may be presented as nested options within sub-menus underneath top-level menus. Each menu option may be a selectable interface element of the subset of selectable interface elements. In some instances, selection of the second grid position corresponds to selection of a menu option within the hierarchical navigation menu. Navigation between hierarchical layers of the menu may generate haptic feedback within the mobile computing device. The haptic feedback may indicate to the user that a menu layer transition has occurred.

In some instances, the second grid position corresponds to a selectable interface element for writing text through motion. The second grid position may include a representation of a text mode. Selection of the second grid position may trigger presentation of a motion-based writing interface. In some embodiments, the second grid position corresponds to a set of data entry options. Pressure applied to opposing sides of the mobile computing device may allow the user to scroll through available data entry formats, such as text entry formats in the form of a virtual keyboard, a motion-based stylus, or any other suitable writing interface.

In operation 360, the display component 140 presents second navigation content in the second portion of the user interface. The second navigation content may include a second subset of selectable interface elements. The second subset of selectable interface elements may be based on the first subset of selectable interface elements and the second graphical content. For example, selection of the second grid position by tapping the mobile computing device may correspond to selection of a menu option in a first hierarchical layer. Selection of the second grid position may and the menu option in the first hierarchical layer may open the second subset of selectable interface elements for selection as a second hierarchical layer subordinate or related to the first hierarchical layer. In some instances, shaking of the mobile computing device may reverse the selection or move up layers of a hierarchical menu.

In some embodiments, the second navigation content is presented in the second portion of the interface within the grid, such that menu options of the second hierarchical layer are presented in the second portion of the user interface as the second navigation content. In some embodiments, the second navigation content is also presented in the first portion of the navigation interface, replacing the first graphical content. In such instances, a hierarchical navigation mode may be presented to enable a user to navigate through a hierarchical set of menu options or drop-down menu options to navigate from a first graphical content to a second graphical content. Once the second graphical content is selected, based on selection of a terminal menu option within the hierarchical set of menu options, the second graphical content may be presented within the first portion of the navigation interface.

In embodiments where the second grid position corresponds to a text entry option, the second navigation content may include a virtual keyboard. The virtual keyboard may be configured such that each key on the virtual keyboard corresponds to a grid position on the navigation grid. The user may also navigate the virtual keyboard using a swiping method for typing words, phrases, or sentences. The swiping method may use one or more text input methodologies, such as predictive text, to determine an intended word or potential words based on movements between keys on the virtual keyboard. The second navigation content may also include a free form text entry field, such as a virtual writing surface. The text entry field may be associated with grid positions and a pointer. Motion of the device may be mapped to the pointer and the grid positions to enable motion of the mobile computing device to be translated into a virtual representation of writing text characters, words, or phrases.

Figure 4:
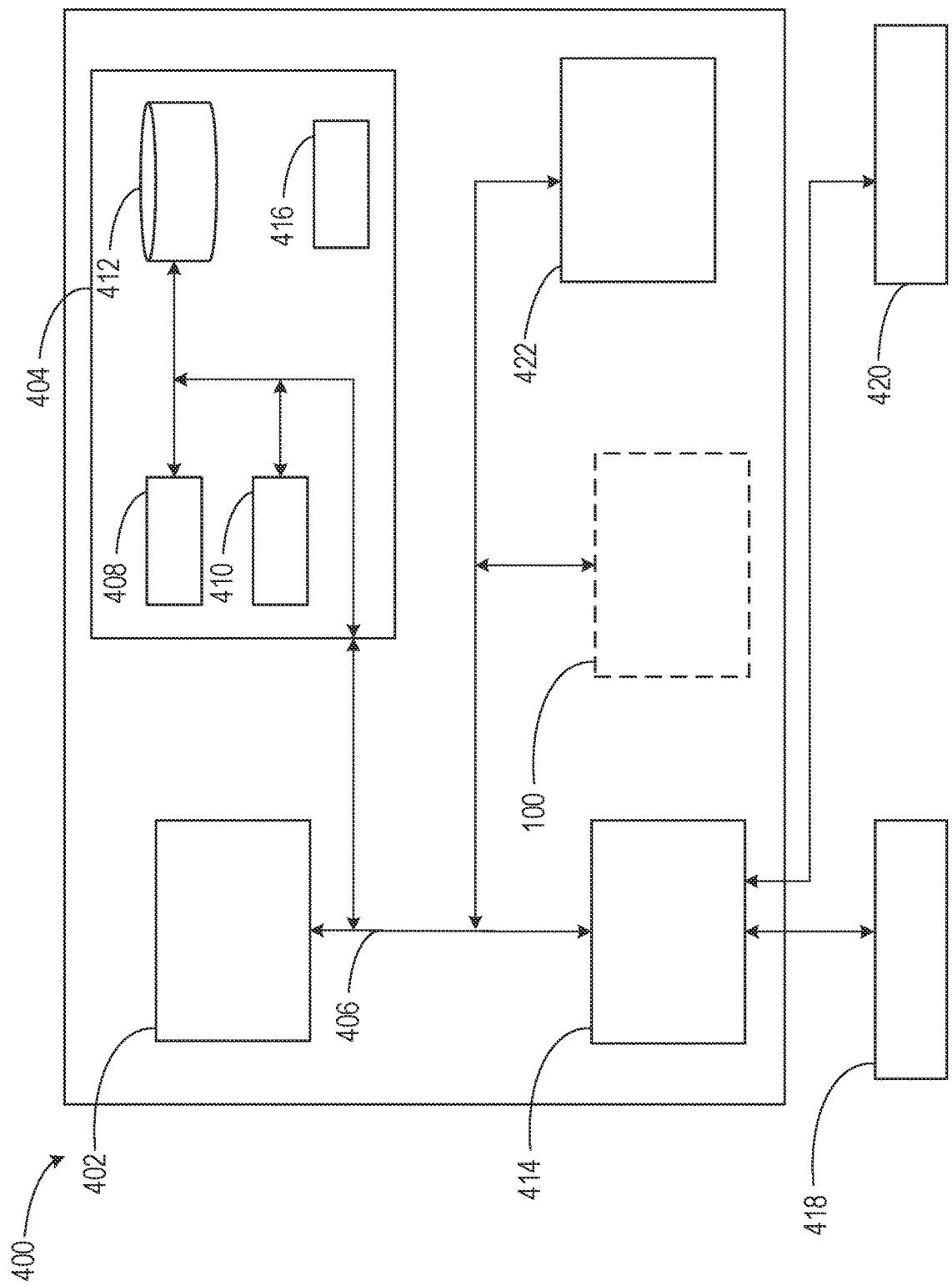
FIG. 4 depicts a block diagram of a computing system for motion-based user interfaces, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for motion-based user interfaces.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the mode component 110, the input component 120, the interface component 130, and the display component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
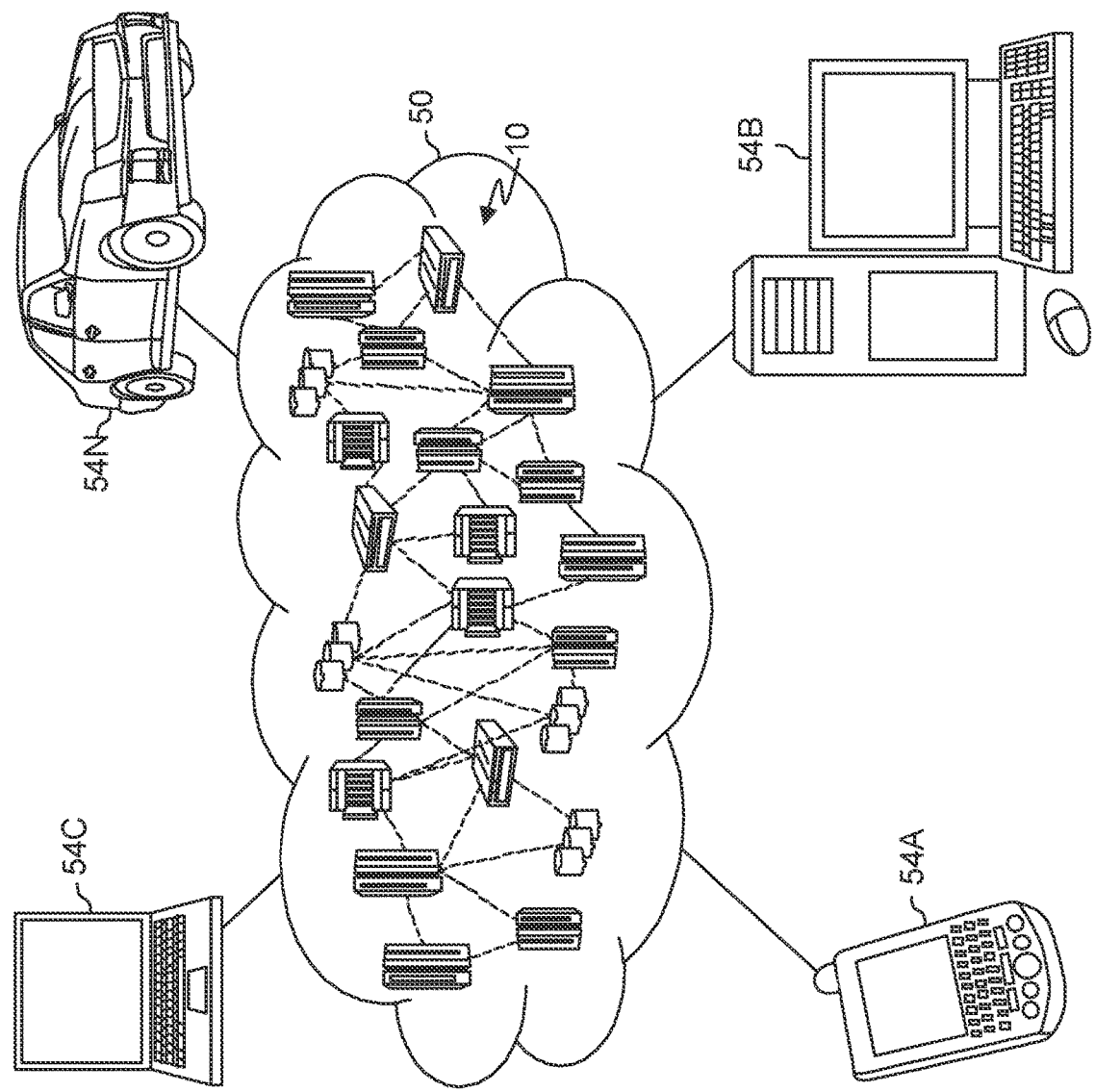
FIG. 5 is a schematic diagram of a cloud computing environment in which concepts of the present disclosure may be implemented, in accordance with an embodiment of the present disclosure.
Figure 6:
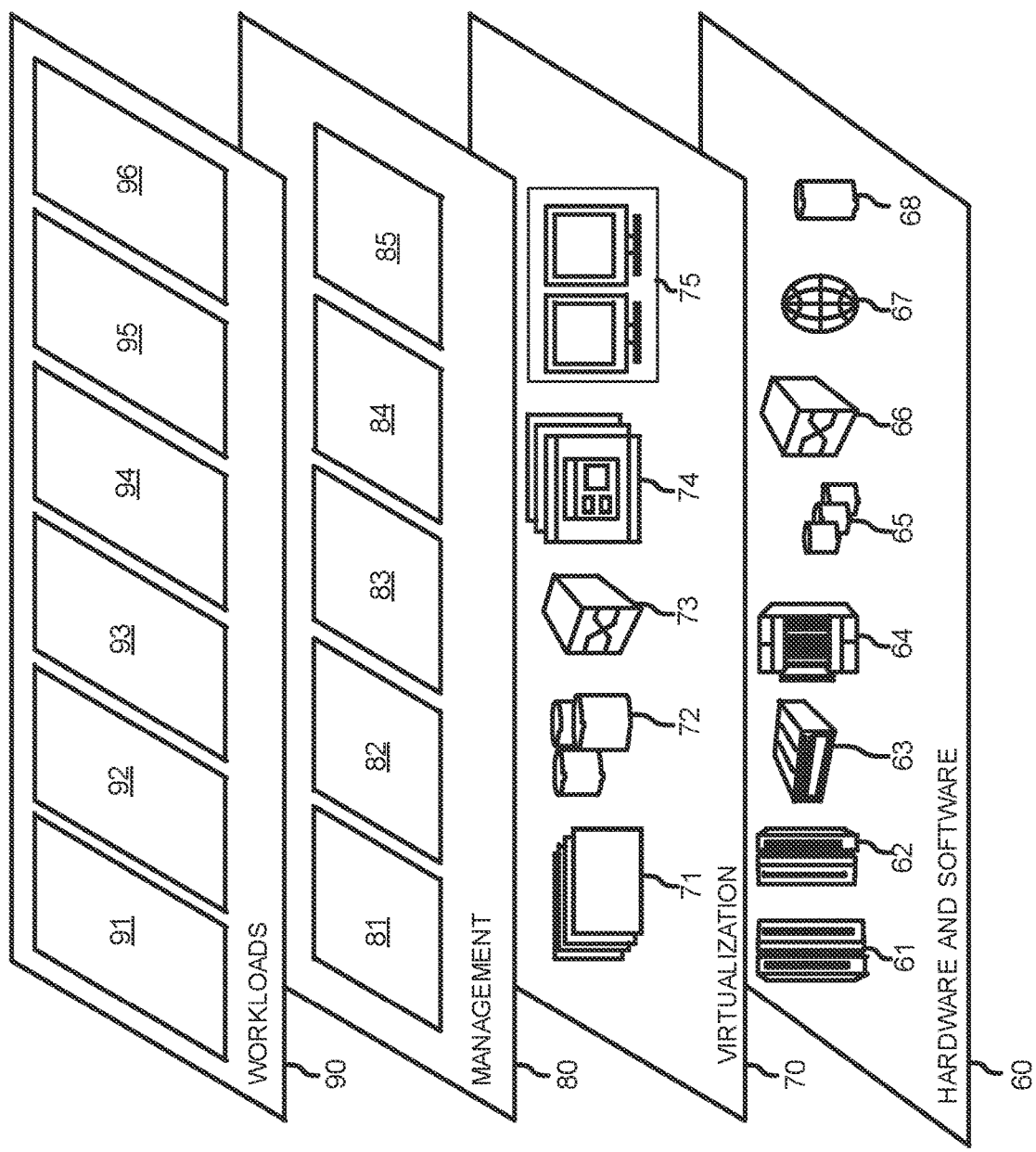
FIG. 6 is a diagram of model layers of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user interface processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, at a mobile computing device, a navigation mode indication, the navigation mode indication representing a selection of single-handed operation of a user interface presented on the mobile computing device;
   generating, at a display device, a navigation interface based on the navigation mode indication, the navigation interface including a first graphical content presented on a user interface prior to generating the navigation interface, the navigation interface configured for navigating user interface content using single-handed operation with a uniform grip and the first graphical content being graphical information to be navigated during single-handed operation of the mobile computing device, the navigation interface being generated by generating a dividing line on the display device to divide the user interface into a first portion and a second portion;

presenting the first graphical content within the first portion of the user interface on the display device, the first graphical content including user interface elements corresponding to a set of user interface actions, the first graphical content being compressed to be presented within the first portion;

presenting a navigation content in the second portion of the user interface, the navigation content including menu options for a portion of user interface actions displayed in the first graphical content;

modifying at least a portion of the navigation interface based on one or more movements of the mobile computing device;

selecting a portion of the navigation interface based on detecting a pressure change on at least a portion of the mobile computing device; and presenting, by the mobile computing device, a second graphical content on the display device based on the selected portion of the navigation interface.

2. The method of claim 1, wherein the navigation content includes navigable graphical content within a grid having a set of grid positions.

3. The method of claim 2, wherein presenting the navigation content further comprises:
identifying a set of selectable interface elements within the first graphical content; and
mapping a subset of selectable interface elements to the set of grid positions.

4. The method of claim 3, wherein modifying the portion of the navigation interface based on one or more movements further comprises:
detecting a first grid position within the navigation content;
determining a second grid position within the navigation content based on the one or more movements; and
highlighting at least a portion of the second grid position.

5. The method of claim 4, wherein the selected portion of the navigation interface is the second grid position and the second grid position corresponds to a selectable interface element of the subset of selectable interface elements, the subset of selectable interface elements being a first subset of selectable interface elements, the method further comprising:
presenting second navigation content in the second portion of the user interface, the second navigation content including a second subset of selectable interface elements based on the first subset of selectable interface elements and the second graphical content.

6. The method of claim 1, wherein the display device is a first display device associated with the mobile computing device, and wherein the navigation content is presented in a second display device associated with an augmented reality device.

7. A system, comprising:
one or more processors; and
a computer-readable storage medium, coupled to the one or more processors, storing program instructions that, when executed by the one or more processors, cause the one or more processors to perform operations comprising:
identifying, at a mobile computing device, a navigation mode indication, the navigation mode indication representing a selection of single-handed operation of a user interface presented on the mobile computing device;
generating, at a display device, a navigation interface based on the navigation mode indication, the navigation interface including a first graphical content presented on a user interface prior to generating the navigation interface, the navigation interface configured for navigating user interface content using single-handed operation with a uniform grip and the first graphical content being graphical information to be navigated during single-handed operation of the mobile computing device, the navigation interface being generated by generating a dividing line on the display device to divide the user interface into a first portion and a second portion;

presenting the first graphical content within the first portion of the user interface on the display device, the first graphical content including user interface elements corresponding to a set of user interface actions, the first graphical content being compressed to be presented within the first portion;

presenting a navigation content in the second portion of the user interface, the navigation content including menu options for a portion of user interface actions displayed in the first graphical content;

modifying at least a portion of the navigation interface based on one or more movements of the mobile computing device;

selecting a portion of the navigation interface based on detecting a pressure change on at least a portion of the mobile computing device; and presenting, by the mobile computing device, a second graphical content on the display device based on the selected portion of the navigation interface.

8. The system of claim 7, wherein the navigation content includes navigable graphical content within a grid having a set of grid positions.

9. The system of claim 8, wherein presenting the navigation content further comprises:
identifying a set of selectable interface elements within the first graphical content; and
mapping a subset of selectable interface elements to the set of grid positions.

10. The system of claim 9, wherein modifying the portion of the navigation interface based on one or more movements further comprises:
detecting a first grid position within the navigation content;
determining a second grid position within the navigation content based on the one or more movements; and
highlighting at least a portion of the second grid position.

11. The system of claim 10, wherein the selected portion of the navigation interface is the second grid position and the second grid position corresponds to a selectable interface element of the subset of selectable interface elements, the subset of selectable interface elements being a first subset of selectable interface elements, the operations further comprising:
presenting second navigation content in the second portion of the user interface, the second navigation content including a second subset of selectable interface elements based on the first subset of selectable interface elements and the second graphical content.

12. The system of claim 7, wherein the display device is a first display device associated with the mobile computing device, and wherein the navigation content is presented in a second display device associated with an augmented reality device.

13. A computer program product comprising a computer readable storage medium having program instructions embodied therewith, the program instructions being executable by one or more processors to cause the one or more processors to perform operations comprising:

identifying, at a mobile computing device, a navigation mode indication, the navigation mode indication representing a selection of single-handed operation of a user interface presented on the mobile computing device;

generating, at a display device, a navigation interface based on the navigation mode indication, the navigation interface including a first graphical content presented on a user interface prior to generating the navigation interface, the navigation interface configured for navigating user interface content using single-handed operation with a uniform grip and the first graphical content being graphical information to be navigated during single-handed operation of the mobile computing device, the navigation interface being generated by generating a dividing line on the display device to divide the user interface into a first portion and a second portion;

presenting the first graphical content within the first portion of the user interface on the display device, the first graphical content including user interface elements corresponding to a set of user interface actions, the first graphical content being compressed to be presented within the first portion;

presenting a navigation content in the second portion of the user interface, the navigation content including menu options for a portion of user interface actions displayed in the first graphical content;

modifying at least a portion of the navigation interface based on one or more movements of the mobile computing device;

selecting a portion of the navigation interface based on detecting a pressure change on at least a portion of the mobile computing device; and presenting, by the mobile computing device, a second graphical content on the display device based on the selected portion of the navigation interface.

14. The computer program product of claim 13, wherein presenting the navigation content further comprises:

identifying a set of selectable interface elements within the first graphical content; and mapping a subset of selectable interface elements to the set of grid positions.

15. The computer program product of claim 14, wherein modifying the portion of the navigation interface based on one or more movements further comprises:

detecting a first grid position within the navigation content;

determining a second grid position within the navigation content based on the one or more movements; and highlighting at least a portion of the second grid position.

16. The computer program product of claim 15, wherein the selected portion of the navigation interface is the second grid position and the second grid position corresponds to a selectable interface element of the subset of selectable interface elements, the subset of selectable interface elements being a first subset of selectable interface elements, the operations further comprising:

presenting second navigation content in the second portion of the user interface, the second navigation content including a second subset of selectable interface elements based on the first subset of selectable interface elements and the second graphical content.

17. The computer program product of claim 13, wherein the display device is a first display device associated with the mobile computing device, and wherein the navigation content is presented in a second display device associated with an augmented reality device.

* * * * *